(12) United States Patent
Lee

(10) Patent No.: US 6,554,466 B1
(45) Date of Patent: Apr. 29, 2003

(54) BLENDER WITH SAFETY DEVICE

(76) Inventor: Ming Tsung Lee, Po-Chuan TSAI, P.O. Box 90, Tainan City (TW)

( * ) Notice: Subject to any disclaimer, the term of this patent is extended or adjusted under 35 U.S.C. 154(b) by 0 days.

(21) Appl. No.: 10/079,916

(22) Filed: Feb. 22, 2002

(51) Int. Cl.$^7$ .............................................. A47J 43/046
(52) U.S. Cl. ..................................... 366/206; 241/37.5
(58) Field of Search ................................. 366/205, 206, 366/314, 601; 241/37.5; 99/348

(56) References Cited

U.S. PATENT DOCUMENTS

| | | | | |
|---|---|---|---|---|
| 1,997,873 A | * | 4/1935 | Poplawski |
| 2,284,155 A | * | 5/1942 | Landgraf |
| 3,612,126 A | * | 10/1971 | Emmons et al. |
| 3,785,579 A | * | 1/1974 | Voglesonger |
| 3,786,999 A | * | 1/1974 | Cabell |
| 3,892,365 A | * | 7/1975 | Verdun |
| 4,107,791 A | * | 8/1978 | Mikituk |
| 4,108,054 A | * | 8/1978 | Klocker et al. |
| 4,111,372 A | * | 9/1978 | Hicks et al. |
| 4,200,240 A | * | 4/1980 | Machuron |
| 4,213,569 A | * | 7/1980 | Amiot |
| 4,216,917 A | * | 8/1980 | Clare et al. |
| 4,269,519 A | * | 5/1981 | Birr |
| 4,297,038 A | * | 10/1981 | Falkenbach |
| 4,335,860 A | * | 6/1982 | Grandel et al. |
| 4,371,118 A | * | 2/1983 | Sontheimer et al. |
| 4,373,677 A | * | 2/1983 | Kunihiro |
| 4,396,159 A | * | 8/1983 | Podell |
| 4,487,509 A | * | 12/1984 | Boyce |
| 4,506,836 A | * | 3/1985 | Williams |
| 4,629,131 A | * | 12/1986 | Podell |
| 4,691,870 A | * | 9/1987 | Fukunaga et al. |
| 4,741,482 A | * | 5/1988 | Coggiola et al. |
| 5,323,973 A | * | 6/1994 | Ferrara, Jr. |
| 5,338,111 A | * | 8/1994 | Trocherie et al. |
| 5,353,697 A | * | 10/1994 | Venturati et al. |
| 5,567,049 A | * | 10/1996 | Beaudet et al. |
| 5,639,161 A | * | 6/1997 | Sirianni |
| 5,779,358 A | * | 7/1998 | Bevington |
| 5,809,872 A | * | 9/1998 | Sundquist |
| 6,112,649 A | * | 9/2000 | Jeong |
| 6,186,425 B1 | * | 2/2001 | Celso De Almeida Mattos |
| 6,209,810 B1 | * | 4/2001 | Brisard |
| 6,350,053 B1 | * | 2/2002 | Morin |
| 2002/0012288 A1 | * | 1/2002 | Masip et al. |
| 2002/0071340 A1 | * | 6/2002 | Juriga |

FOREIGN PATENT DOCUMENTS

| | | | |
|---|---|---|---|
| EP | 257705 | * | 3/1988 |
| EP | 571348 | * | 11/1993 |
| EP | 638273 | * | 2/1995 |
| GB | 2249368 | * | 5/1992 |
| GB | 2352648 | * | 2/2001 |

* cited by examiner

Primary Examiner—Charles E. Cooley

(57) ABSTRACT

A blender in the invention includes a handle at one side of a container and having a link rod disposed therein. A microswitch is in a base and an actuating rod is above the microswitch. The link rod has an upper end protruding into a slide groove of the handle and a lower end extending into a lower portion of the container and touched against the actuating rod. When the cover is not closed on the container, the blender cannot work even if a rotary switch is turned on because the electric circuit of the microswitch is broken. When the cover is closed on the container, its push block is lowered to press the link rod down to force the actuating rod to be contacted with the microswitch to form an open electric circuit enabling the blender to work, thereby providing the blender with high security in use.

4 Claims, 6 Drawing Sheets

BLENDER WITH SAFETY DEVICE

BACKGROUND OF THE INVENTION

1. Field of the Invention

This invention relates to a blender, particularly to one having a cover provided with a push block capable of being lowered to press a link rod disposed in a handle down when the cover is closed on a container so that a lower end of the link rod is lowered to force an actuating rod to be come into contact with a microswitch so as to form an open electric circuit enabling the blender to liquidize fruits and vegetables after a rotary switch of a base is turned on, thereby providing the blender with high security in use.

2. Description of the Prior Art

Generally speaking, most known conventional blenders are not equipped with safety devices and will work as soon as their power units are turned on even if, their covers are not closed on their containers. However, it is very troublesome for users to clean mixed pulps and juices that are ejected from the mouths of the containers when the covers are not closed on the containers. Moreover, it is very dangerous for children to use alone or play with such blenders without getting attention from their parents because they may extend their hands into the containers and thus are badly hurt by the working blades of the conventional blenders.

SUMMARY OF THE INVENTION

The main purpose of the invention is to offer a blender with high security in use.

The main feature of the invention is to provide a blender mainly including:

a base having a rotary switch disposed thereon and a slot disposed in an upper portion thereof;

a container placed above the base and having a handle disposed at one side thereof, the handle provided with a hollow chamber disposed therein and a slide groove disposed at a top surface thereof;

a link rod disposed in the chamber of the handle and having an upper portion and a lower portion: the upper portion of the link rod provided with a projecting end disposed thereon and a first flexible member with one end disposed at a bottom of the upper portion of the link rod and with the other end pressed against an inner wall of the chamber of the handle to urge the link rod upwards to an upper position, and the lower portion of the link rod capable of extending into a lower portion of the container and provided with a press end capable of being inserted into the slot of the base;

a push-pull button disposed above the slide groove of the handle and having an inclined plane disposed on a front end thereof, an engagement groove disposed at a front side thereof and a second flexible member with one end disposed at a rear side thereof and with the other end pressed against an inner wall of an upper portion of the chamber of the handle;

a cover capable of being closed on the container and having a push block disposed on an outer edge thereof; and, a switch seat disposed in the base and having a microswitch disposed therein, a through hole formed in an upper wall thereof, an actuating rod disposed above the switch seat and provided with a rod body, and a third flexible member covered on the rod body of the actuating rod, the rod body of the actuating rod having a stop part protruded thereon, an upper end of the rod body of the actuating rod extending into the slot of the base and touched against the press end of the link rod and a lower end of the rod body of the actuating rod extending through the through hole and disposed above the microswitch, the third flexible member provided with an upper end touched against a bottom of the stop part of the rod body of the actuating rod and a lower end pressed against the upper wall of the switch seat to urge the actuating rod upwards.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
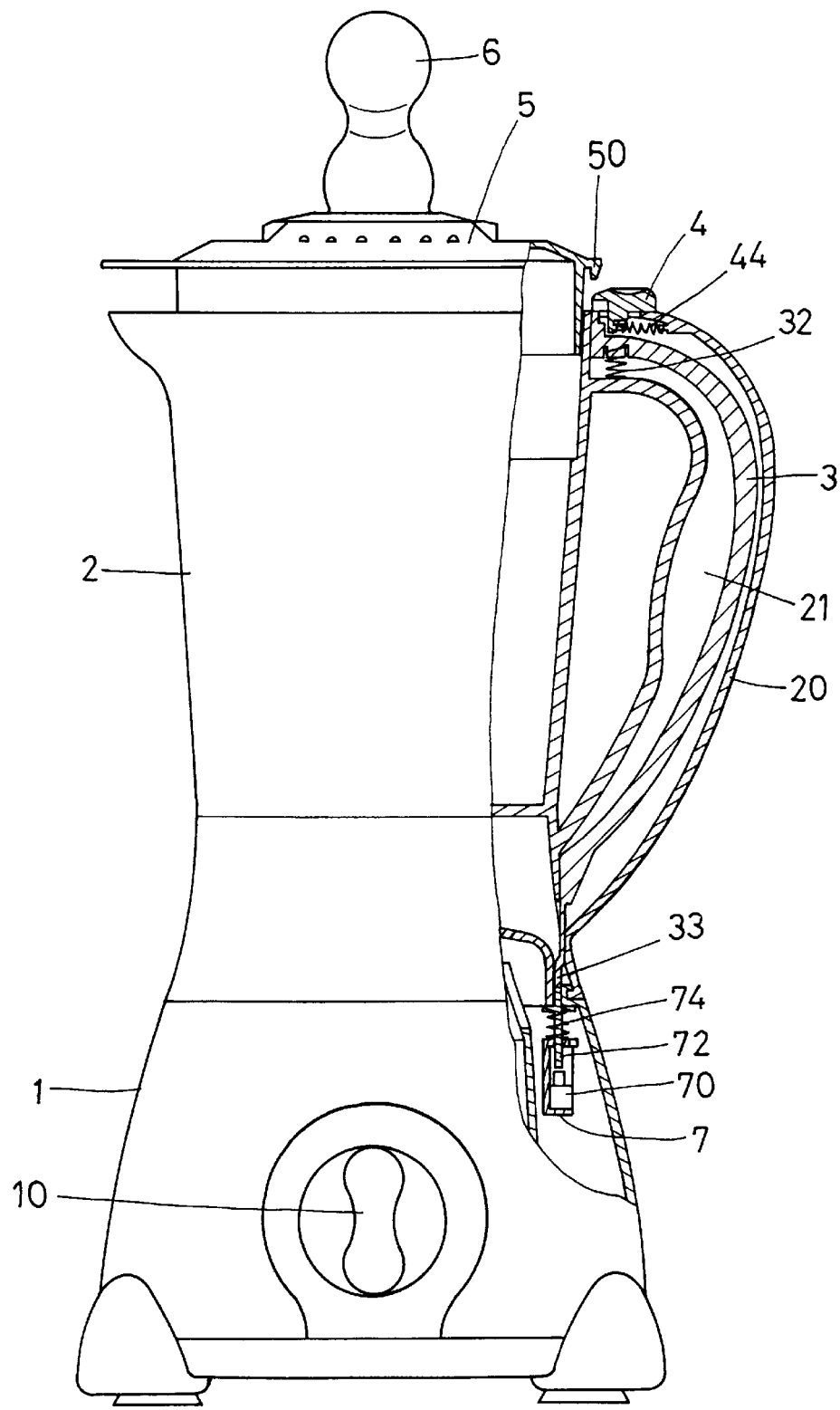
FIG. 1 is a schematic view of a blender in the present invention, showing that a cover is not closed on a container.
Figure 2:
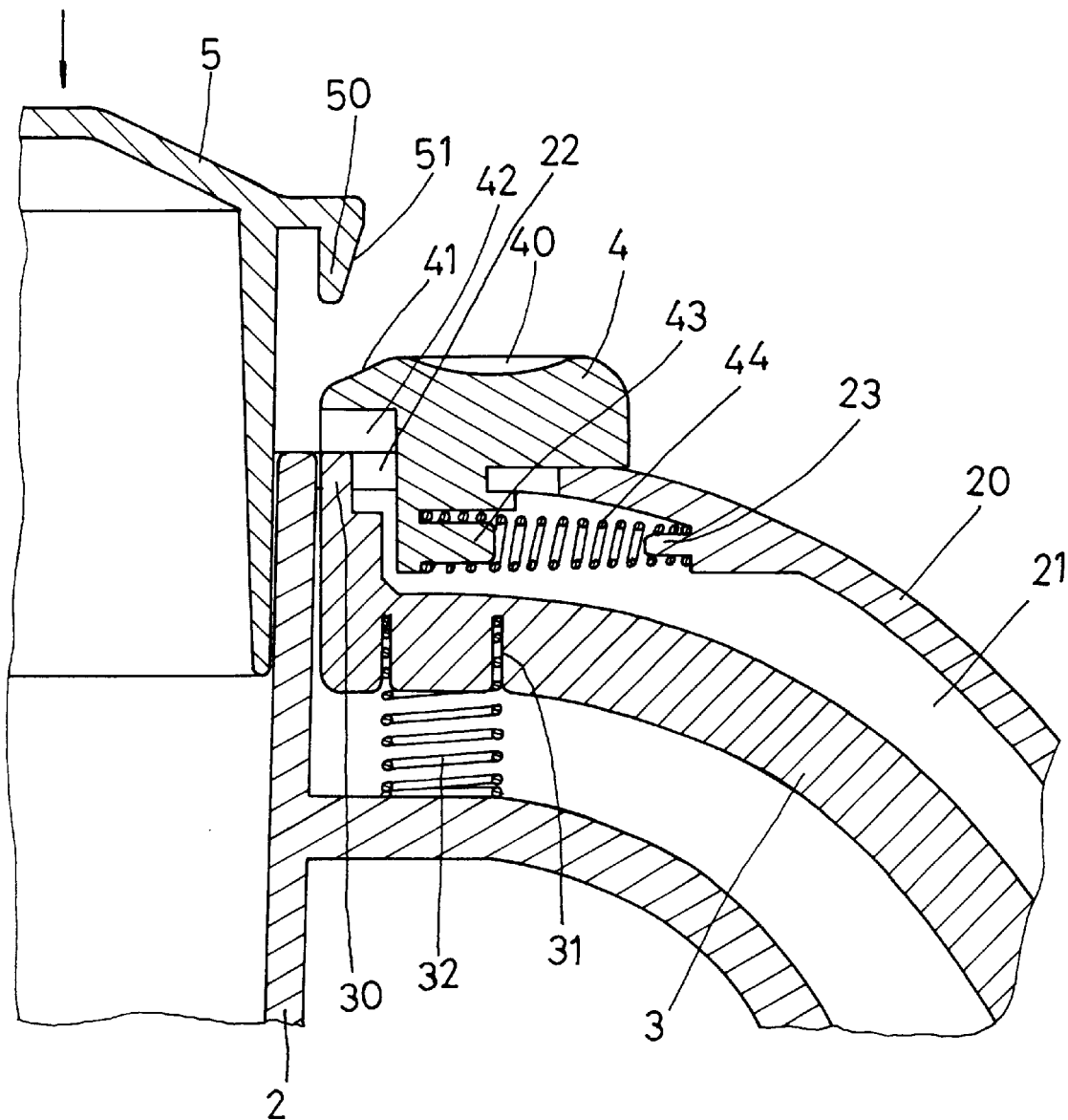
FIG. 2 is a partial enlarged sectional view of the blender in the present invention, showing an upper portion of a handle while the cover is not closed on the container.
Figure 3:
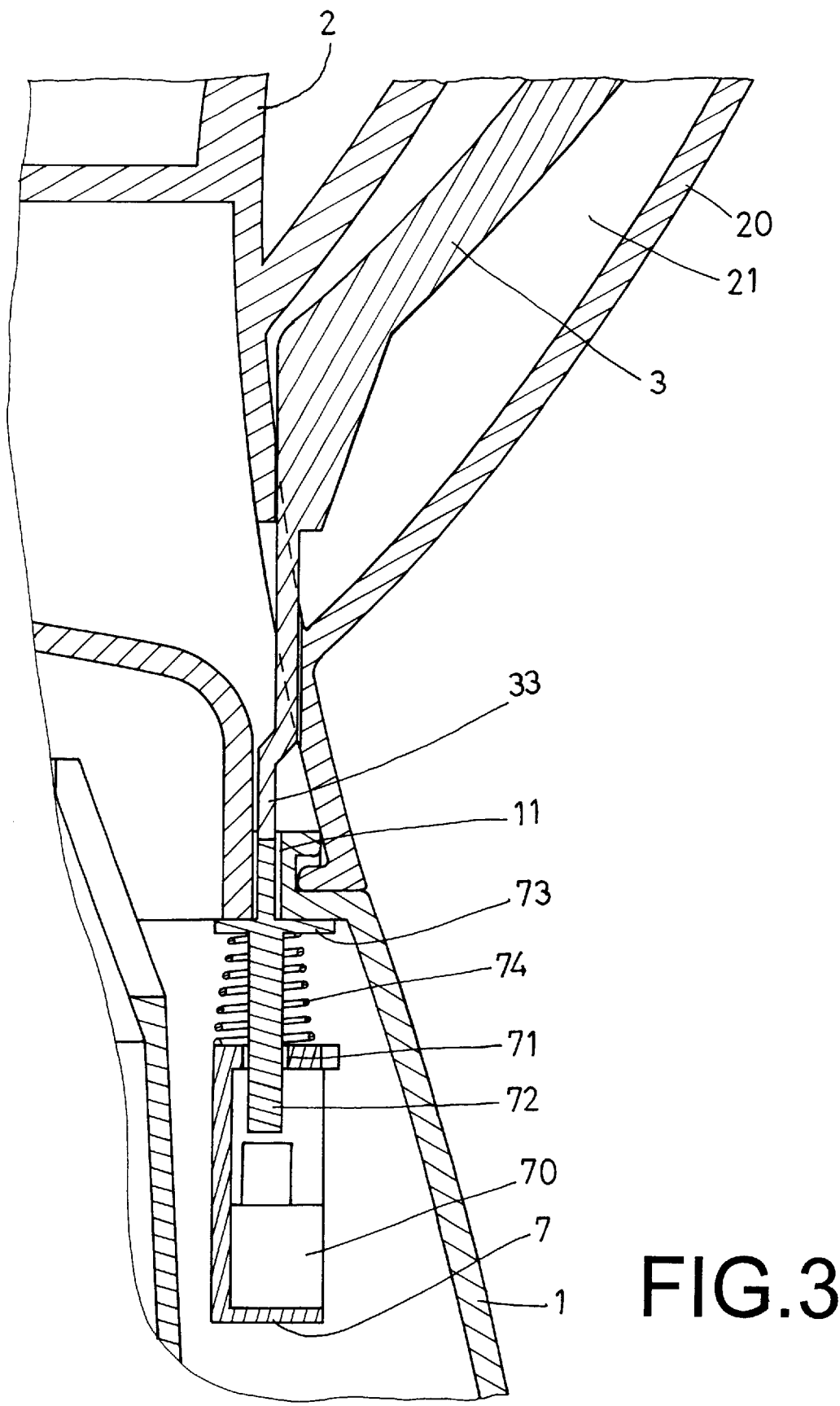
FIG. 3 is a partial enlarged sectional view of the blender in the present invention, showing that a lower end of a link rod of the handle is not lowered to press an actuating rod of a switch seat down while the cover is not closed on the container.

A preferred embodiment of a blender in the present invention, as shown in FIGS. 1, 2 and 3, mainly includes a base 1, a container 2, a link rod 3, a push-pull button 4, a cover 5, a mixing rod 6 and a switch seat 7.

The base 1 has a rotary switch 10 disposed thereon and a slot 11 disposed in an upper portion thereof.

The container 2 placed above the base 1 has a handle 20 disposed at one side thereof. The handle 20 is provided with a hollow chamber 21 disposed therein and a slide groove 22 disposed at a top surface thereof. A first post 23 is disposed in an upper portion of the chamber 21.

The link rod 3 disposed in the chamber 21 of the handle 20 has an upper portion and a lower portion: the upper portion of the link rod 3 provided with a projecting end 30 disposed thereon and a ring groove 31 disposed at a bottom thereof and being fitted in by a first flexible member 32 (may be a spring) whose an outer end is pressed against an inner wall of the chamber 21 of the handle 20 to urge the link rod 3 upwards to an upper position, and the lower portion of the link rod 3 capable of extending into a lower portion of the container 2 and provided with a press end 33 capable of being inserted into the slot 11 of the base 1.

The push-pull button 4 disposed above the slide groove 22 of the handle 2 has a curved recess 40 disposed at a top surface thereof, an inclined plane 41 disposed on a front end thereof, an engagement groove 42 disposed at a front side thereof, and a second post 43 disposed at a rear side thereof and covered by a second flexible member 44 (may be a spring) whose the other end is covered on the first post 23 of the chamber 21 of the handle 20.

The cover 5 capable of being closed on the container 2 and has a push block 50 disposed on an outer edge thereof. An inclined plane 51 is disposed on a side wall of the push block 50.

The mixing rod 6 has an upper portion disposed above the cover 5 and a lower portion extending into the container 2.

The switch seat 7 disposed in the base 1 has a microswitch 70 disposed therein, a through hole 71 formed in an upper wall thereof, an actuating rod 72 disposed above the switch seat 7 and provided with a rod body, and a third flexible member 74 covered on the rod body of the actuating rod 7. The rod body of the actuating rod 7 has a stop part 73 protruded thereon. An upper end of the rod body of the actuating rod 72 extends into the slot 11 of the base 1 and is touched against the press end 33 of the link rod 3. A lower end of the rod body of the actuating rod 72 extends through the through hole 71 and is disposed above the microswitch 70. The third flexible member 74 is provided with an upper end touched against a bottom of the stop part 73 and a lower end pressed against the upper wall of the switch seat 7 to urge the actuating rod 72 upwards.

Figure 4:
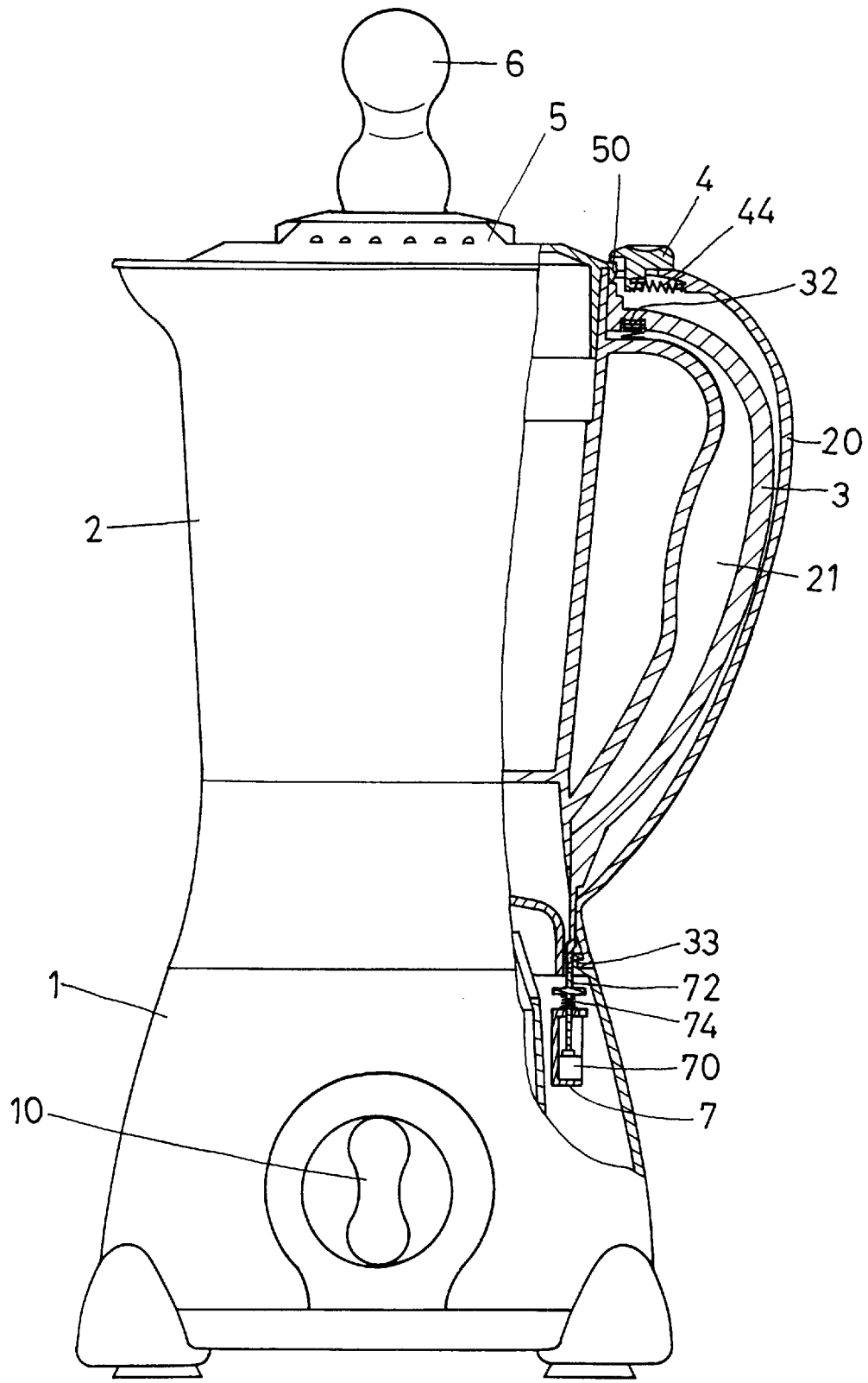
FIG. 4 is a schematic view of the blender in the present invention, showing that the cover is closed on the container.
Figure 5:
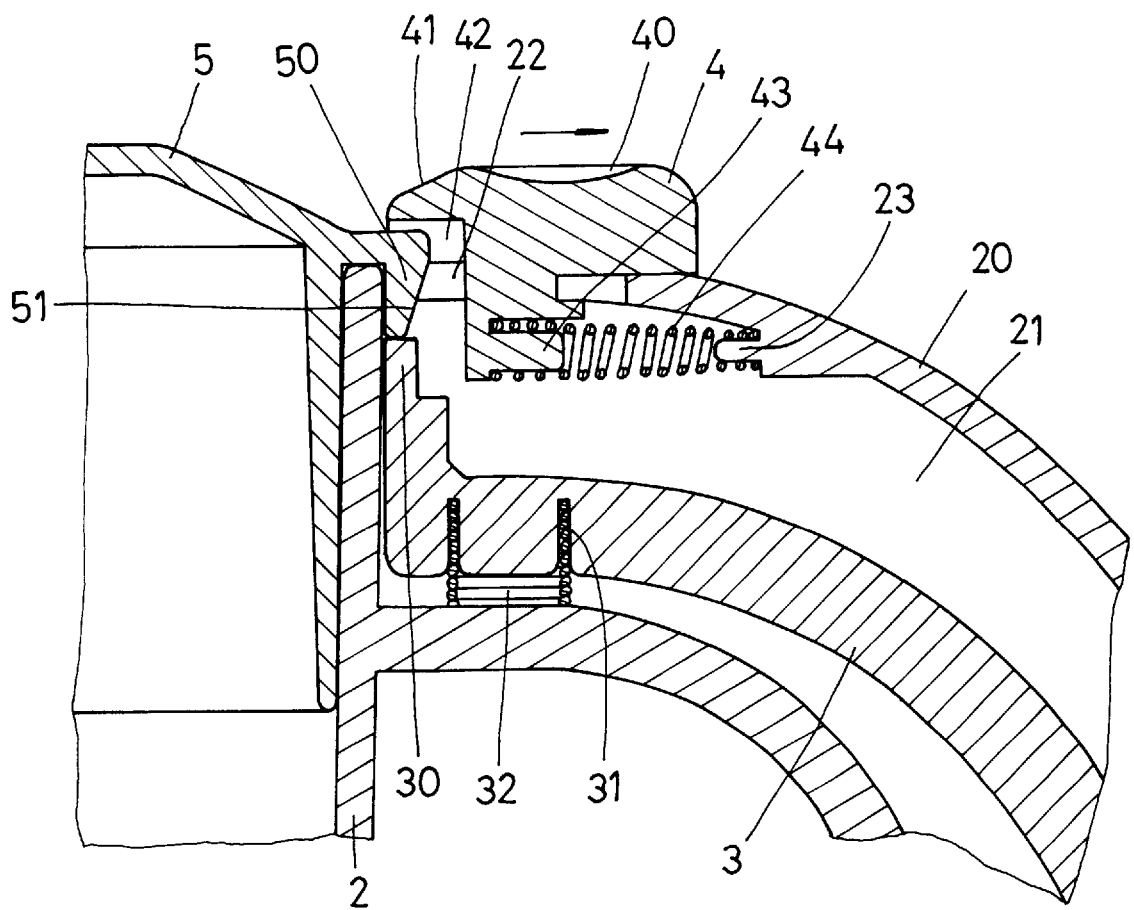
FIG. 5 is a partial enlarged sectional view of the blender in the present invention, showing the upper portion of the handle while the cover is closed on the container; and, FIG. 6 is a partial enlarged sectional view of the blender in the present invention, showing that a lower end of a link rod of the handle is lowered to press an actuating rod of a switch seat down while the cover is closed on the container.
Figure 6:
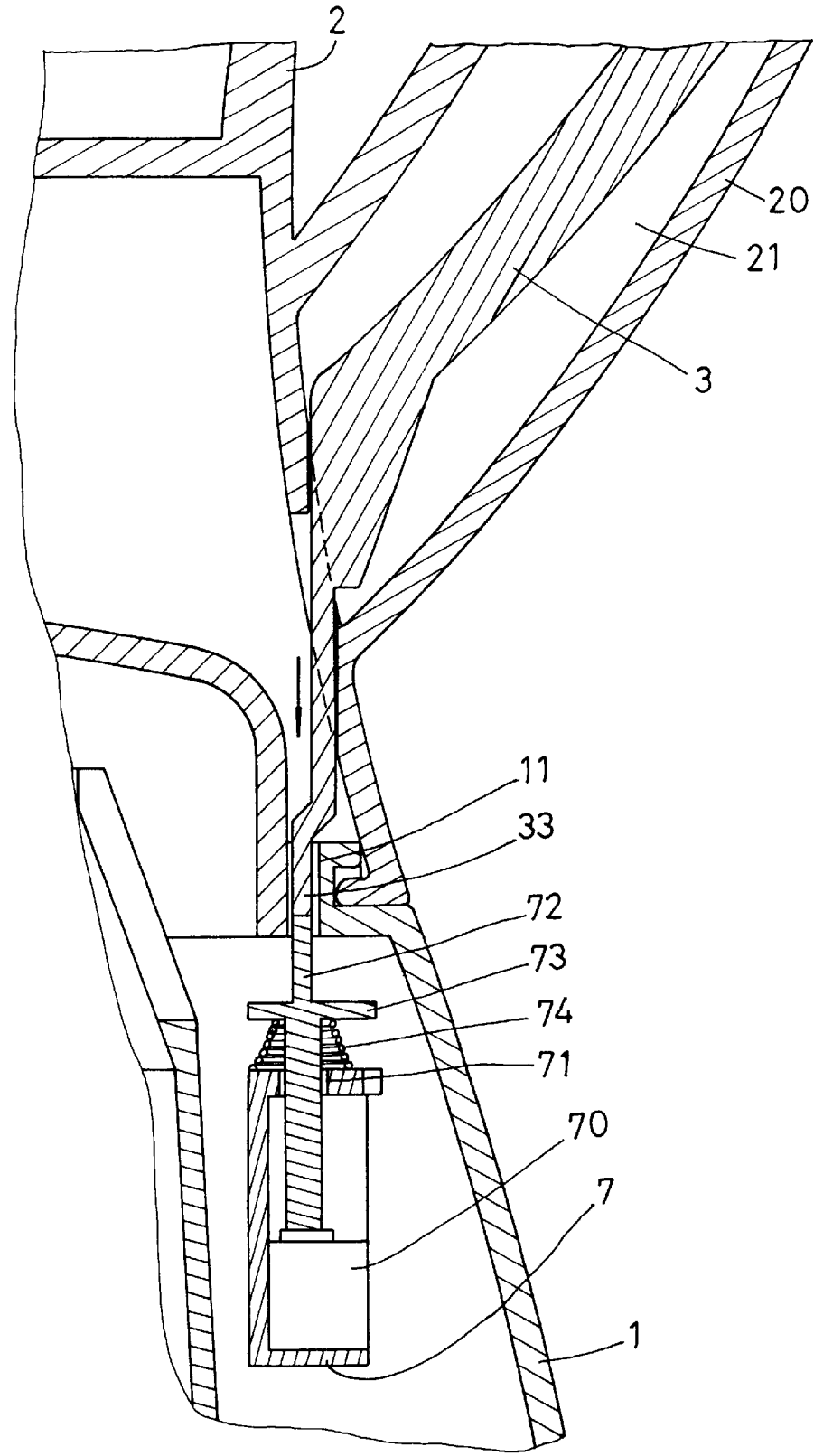

In using, referring to FIGS. 1, 2 and 3, after fruits and vegetables are put into the container 2 and the rotary switch 10 of the base 1 is turned on, a user is still unable to make the blender of the present invention operated to liquidize the fruits and vegetables unless the cover 5 is closed on the container 2 because if the cover 5 is not closed on the container 2, the actuating rod 74 is not pressed down to be come into contact with the microswitch 70 to form an open electric circuit, i.e., the electric circuit is still in a broken status. When the cover 5 is closed on the container 2, as shown in FIGS. 4, 5 and 6, the inclined plane 51 of the push block 50 of the cover 5 is capable of being lowered to force the inclined plane 41 of the push-pull button 4 to be moved outwards with the second flexible member 44 of the push-pull button 4 pressed in a compressed status so that the push block 50 of the cover 5 is capable of being downwardly inserted into the slide groove 22 of the handle 20 and pressing the projecting end 30 of the link rod 3 down to make the whole link rod 3 lowered with the first flexible member 32 of the link rod 3 pressed by the upper portion of the link rod 3 to be in a compressed status. When the push block 50 of the cover 5 is engaged in the slide groove 22 of the handle 20 without pushing the push-pull button 4, the push-pull button 4 will be immediately back to its initial position under the resilience of the second flexible member 44 of the push-pull button 4 so as to limit the push block 50 of the cover 5 in the engagement groove 42 of the push-pull button 4. At the same time, as shown in FIG. 6, the whole link rod 3 is lowered under the pressing of the push block 50 of the cover 5 to force the press end 33 of the link rod 3 to press the actuating rod 72 down with the third flexible member 74 pressed by the stop part 73 of the actuating rod 72 to be in a compressed status so that the lower end of the actuating rod 72 is capable of being come into contact with the microswitch 70 to form an open electric circuit. At this time, the blender of the present invention is capable of being operated to liquidize the fruits and vegetables when the rotary switch 10 of the base 1 is turned on.

After the blender is finished the liquidizing of the fruits and vegetables and the power source is cut off, the closed cover 5 is capable of being opened only by having the push-pull button 4 pulled outwards with the second flexible member 44 of the push-pull button 4 pressed in a compressed status so that the push block 50 of the cover 5 is not limited in the engagement groove 42 of the push-pull button 4, by which the cover 5 is very convenient to be removed from the container 2, as shown in FIG. 5. Once the push block 50 of the cover 5 is not inserted in the slide groove 22 of the handle 20 to press the projecting end 30 of the link rod 3 down, the link rod 3 will be immediately urged upwards back to its initial position under the resilience of the first flexible member 32 disposed at the bottom of the upper portion of the link rod 3 with the projecting end 30 of the link rod 3 moved back to the slide groove 22 of the handle 20, as shown in FIG. 2. In the meantime, the actuating rod 72 is no longer pressed by the press end 33 of the link rod 3 and immediately urged upwards under the resilience of the third flexible member 74 disposed above the upper wall of the switch seat 7 so that the lower end of the actuating rod 72 is moved upwards away from the microswitch 70 and thus the electric circuit of the microswitch 70 is broken, i.e., in a broken status. As soon as the cover 5 is removed from the container 2, it is unnecessary to pull the push-pull button 4 outwards so that the push-pull button 4 will be immediately urged back to its initial position under the resilience of the first flexible member 44. At this time, a mixture of juices liquidized from the fruits and the vegetables is ready to be flowed out of the container 2 for drinking, which is very convenient and secure in use.

While the preferred embodiment of the invention has been described above, it will be recognized and understood that various modifications may be made therein and the appended claims are intended to cover all such modifications that may fall within the spirit and scope of the invention.

What is claimed is:

1. A blender comprising:

a base having a rotary switch disposed thereon and a slot disposed in an upper portion thereof;

a container placed above said base and having a handle disposed at one side thereof, said handle provided with a hollow chamber disposed therein and a slide groove disposed at a top surface thereof;

a link rod disposed in said chamber of said handle and having an upper portion and a lower portion: said upper portion of said link rod provided with a projecting end disposed thereon and a first flexible member with one end disposed at a bottom of said upper portion of said link rod and with the other end pressed against an inner wall of said chamber of said handle to urge said link rod upwards to an upper position, and said lower portion of said link rod capable of extending into a lower portion of said container and provided with a press end capable of being inserted into said slot of said base;

a push-pull button disposed above said slide groove of said handle and having an inclined plane disposed on a front end thereof, an engagement groove disposed at a front side thereof and a second flexible member with one end disposed at a rear side thereof and with the other end pressed against an inner wall of an upper portion of said chamber of said handle;

a cover capable of being closed on said container and having a push block disposed on an outer edge thereof; and, a switch seat disposed in said base and having a microswitch disposed therein, a through hole formed in an upper wall thereof, an actuating rod disposed above said switch seat and provided with a rod body, and a third flexible member covered on said rod body of said actuating rod, said rod body of said actuating rod having a stop part protruded thereon, an upper end of said rod body of said actuating rod extending into said slot of said base and touched against said press end of said link rod, and a lower end of said rod body of said actuating rod extending through said through hole and disposed above said microswitch, said third flexible member provided with an upper end touched against a bottom of said stop part of said rod body of said actuating rod and a lower end pressed against said upper wall of said switch seat to urge said actuating rod upwards.

2. The blender as claimed in claim 1, wherein a first post is disposed in said upper portion of said chamber of said handle, and a second post is disposed at said rear side of said push-pull button, whereby said second flexible member of said push-pull button is capable of being covered on said first post and said second post.

3. The blender as claimed in claim 1, wherein a ring groove is capable of being disposed in said bottom of said upper portion of said link rod for being fitted in by said first flexible member of said link rod.

4. The blender as claimed in claim 1, wherein an inclined plane is disposed on a side wall of said push block of said cover.

* * * * *